(12) United States Patent
Hayashi et al.

(10) Patent No.: US 7,222,554 B2
(45) Date of Patent: May 29, 2007

(54) SHIFT ACTUATOR FOR A TRANSMISSION

(75) Inventors: Masahiko Hayashi, Kanagawa (JP);
Yasushi Yamamoto, Kanagawa (JP);
Nobuyuki Iwao, Kanagawa (JP)

(73) Assignee: Isuzu Motors Limited, Tokyo (JP)

( * ) Notice: Subject to any disclaimer, the term of this patent is extended or adjusted under 35 U.S.C. 154(b) by 190 days.

(21) Appl. No.: 10/946,171

(22) Filed: Sep. 22, 2004

(65) Prior Publication Data
US 2005/0034550 A1    Feb. 17, 2005

Related U.S. Application Data

(62) Division of application No. 10/187,018, filed on Jul. 2, 2002, now Pat. No. 6,889,573.

(30) Foreign Application Priority Data

Jul. 2, 2001    (JP) ............................. 2001-200802
Oct. 31, 2001    (JP) ............................. 2001-334485

(51) Int. Cl.
   *F16H 59/04* (2006.01)
(52) U.S. Cl. ..................... 74/473.12; 74/335; 335/266
(58) Field of Classification Search .................. 74/335, 74/473.12, 473.3, 473.33; 335/229, 234, 335/266
   See application file for complete search history.

(56) References Cited

U.S. PATENT DOCUMENTS

| | | | |
|---|---|---|---|
| 1,900,119 A | 3/1933 | Lysholm et al. ............ 74/720 |
| 1,993,247 A | 3/1935 | Pentai .......................... 74/364 |
| 3,504,315 A * | 3/1970 | Stanwell ..................... 335/234 |
| 3,728,654 A * | 4/1973 | Tada ........................... 335/234 |
| 3,795,153 A | 3/1974 | Seilly ........................... 74/335 |
| 4,422,060 A * | 12/1983 | Matsumoto et al. ........ 335/256 |
| 5,078,020 A | 1/1992 | Hasegawa ................. 74/473.22 |
| 5,241,292 A * | 8/1993 | Bjorknas et al. ............. 335/256 |
| 5,507,197 A * | 4/1996 | Devaud et al. ............... 74/335 |
| 6,223,617 B1 | 5/2001 | Tischer et al. ........... 74/473.11 |
| 6,823,757 B2 * | 11/2004 | Kobayashi ............... 74/473.12 |

FOREIGN PATENT DOCUMENTS

DE    44 08 209    * 9/1994

* cited by examiner

Primary Examiner—William O. Joyce

(57) ABSTRACT

A shift actuator for a transmission for turning, in a direction of shift, a shift lever support mechanism mounting the shift lever of the transmission, wherein it comprises an operation lever coupled, at its intermediate portion, to said shift lever support mechanism, the first electromagnetic solenoid and the second electromagnetic solenoid which are each coupled to both ends of said operation lever so as to operate in the upward and downward directions; and an operation rod of said first electromagnetic solenoid is coupled to one end of said operation lever and an operation rod of said second electromagnetic solenoid is coupled to the other end of said operation lever.

7 Claims, 7 Drawing Sheets

(a)

(b)

SHIFT ACTUATOR FOR A TRANSMISSION

CROSS-REFERENCE TO RELATED APPLICATION

The present application is a Divisional Application of U.S. patent application Ser. No. 10/187,018, filed on Jul. 2, 2002 now U.S. Pat. No. 6,889,573.

FIELD OF THE INVENTION

The present invention relates to a shift actuator for a transmission for operating a shift lever of the transmission mounted on a vehicle in a direction of shift.

DESCRIPTION OF THE RELATED ART

As a shift actuator of a transmission for operating a shift lever of the transmission in a direction of shift, there is usually used a fluid pressure cylinder using a fluid pressure such as pneumatic pressure or hydraulic pressure as a source of operation. The shift actuator employing the hydraulic cylinder requires a piping for connection to a source of fluid pressure and an arrangement of an electromagnetic change-over valve for changing over the flow passage of the operation fluid, and requires space for arranging the above components, resulting in an increase in the weight of the device as a whole.

In recent years, there has been proposed an electric motor-type actuator as a shift actuator for a transmission mounted on a vehicle which is provided with neither a source of compressed air nor a source of hydraulic pressure. The shift actuator comprising the electric motor can be constituted in a compact size as a whole and in a reduced weight since it needs neither the pipe for connection to the source of hydraulic pressure nor the electromagnetic change-over valve unlike the actuator that uses a fluid pressure cylinder.

Meanwhile, the actuator using the electric motor requires a speed reduction mechanism for obtaining a predetermined operation force. As the speed reduction mechanisms, there have been proposed the one using a ball-screw mechanism and the one using a gear mechanism. However, the actuators using the ball-screw mechanism and the gear mechanism are not necessarily satisfactory in regard to durability of the ball screw mechanism and of the gear mechanism and in regard to durability and the operation speed of the electric motor.

As a source of driving the shift actuator capable of operating the shift lever in the direction of shift without using the speed reduction mechanism, the present applicant has proposed a gear change device using an electromagnetic solenoid in Japanese Patent Application No. 2001-183470.

As a shift actuator for a transmission having excellent durability and a high operation speed, the present applicant has further proposed the one comprising an operation rod that engages with an operation member coupled to the shift lever of the transmission, a magnetic moving member arranged on the outer peripheral surface of the operation rod, a cylindrical fixed yoke arranged to surround the magnetic moving member, and a pair of coils arranged side by side in the axial direction inside the fixed yoke in Japanese Patent Application No. 2001-13163.

However, the electromagnetic solenoid has a moving iron core having a large mass that operates in the axial direction and hence, the moving iron core is affected by its own gravity and by the acceleration of the vehicle. Besides, the operation rod and the magnetic moving member have large masses which are subject to be affected by the gravity and the acceleration of the vehicle. Therefore, the operation force undergoes change depending upon the arrangement of the shift actuator and the operation condition of the vehicle. That is, the shift actuator mounted on the vehicle is usually arranged on a horizontal plane. Therefore, the moving iron core of the electromagnetic solenoid, the operation rod and magnetic moving member are affected by the acceleration in their respective directions and by the gravity when the vehicle is traveling on a slope or is accelerating or decelerating. Therefore, the shifting force may often become insufficient when the operation force is decreased depending upon the operation conditions.

SUMMARY OF THE INVENTION

It is, therefore, an object of the present invention to provide a shift actuator for a transmission capable of producing a constant shifting force at all times without being affected by gravity or acceleration.

In order to accomplish the above-mentioned object according to the present invention, there is provided a shift actuator for a transmission for turning, in a direction of shift, a shift lever support mechanism mounting the shift lever of the transmission, wherein:

it comprises an operation lever coupled, at its intermediate portion, to said shift lever support mechanism, the first electromagnetic solenoid and the second electromagnetic solenoid which are each coupled to both ends of said operation lever so as to operate in the upward and downward directions, and an operation rod of said first electromagnetic solenoid being coupled to one end of said operation lever and an operation rod of said second electromagnetic solenoid being coupled to the other end of said operation lever.

The shift lever support mechanism is arranged nearly in a horizontal state, and the first electromagnetic solenoid and the second electromagnetic solenoid are arranged below the shift lever support mechanism.

According to the present invention, there is, further, provided a shift actuator for a transmission for turning, in a direction of shift, a shift lever support mechanism mounting the shift lever of the transmission, wherein:

it comprises an operation lever coupled, at its intermediate portion, to said shift lever support mechanism, the first actuator and the second actuator which are each coupled to both ends of said operation lever so as to operate in the upward and downward directions; and each of said first actuator and said second actuator comprises an operation rod coupled to said operation lever, a magnetic moving member arranged on the outer peripheral surface of said operation rod, a cylindrical fixed yoke arranged to surround said magnetic moving member, and a pair of coils arranged side by side in the axial direction inside said fixed yoke.

The shift lever support mechanism is arranged nearly in a horizontal state, and the first actuator and the second actuator are arranged below the shift lever support mechanism.

It is desired that the magnetic members are arranged on both sides of the pair of coils and that the magnetic members are arranged in the bobbins on which the pair of coils is wound.

DETAILED DESCRIPTION OF THE PREFERRED EMBODIMENTS

The shift actuator for a transmission constituted according to the present invention will now be described in further detail with reference to the accompanying drawings illustrating preferred embodiments of the invention.

Figure 1:
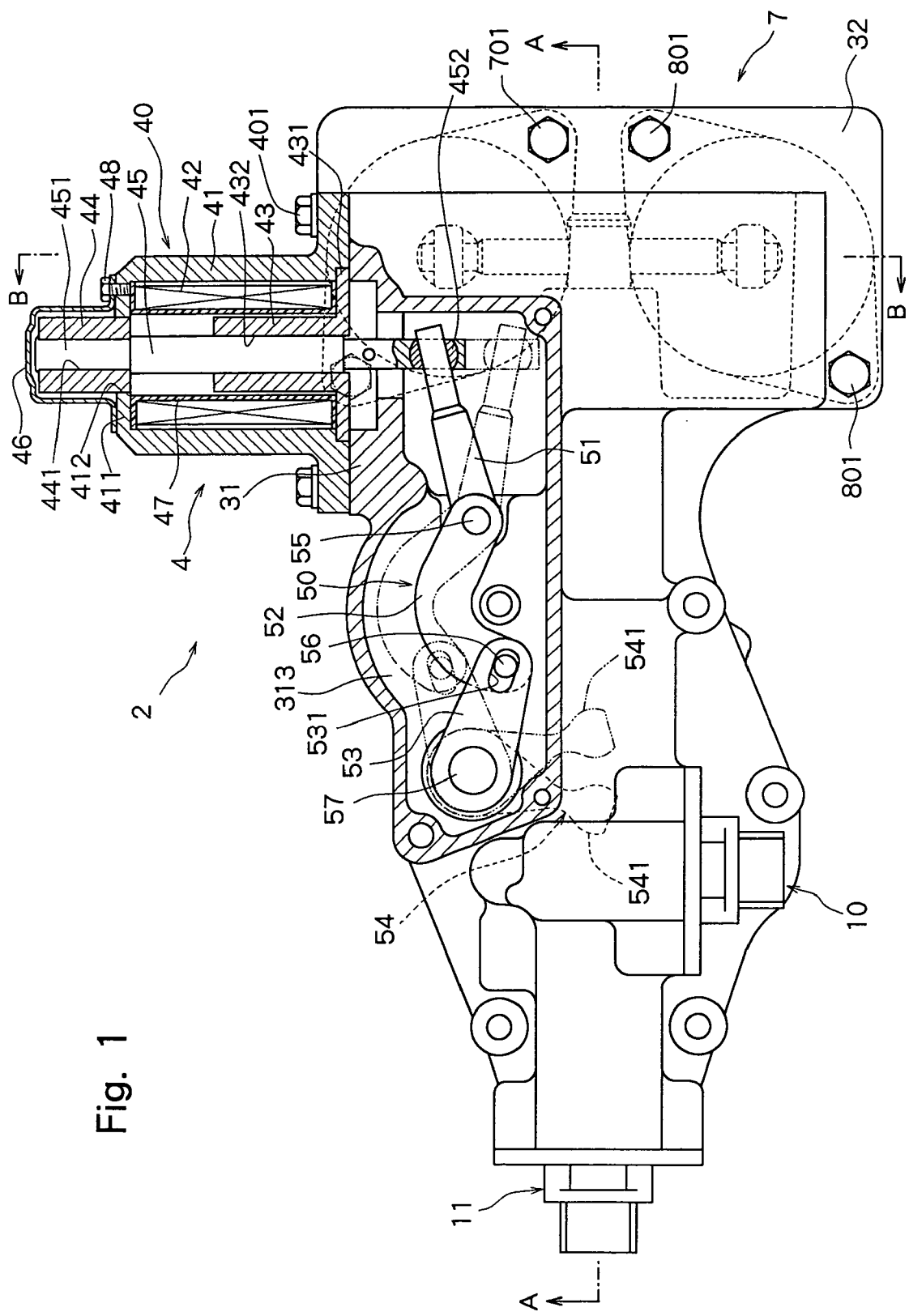
FIG. 1 is a plan view illustrating, partly in a cut-away manner, an embodiment of a gear change device equipped with a shift actuator constituted according to the present invention.
Figure 2:
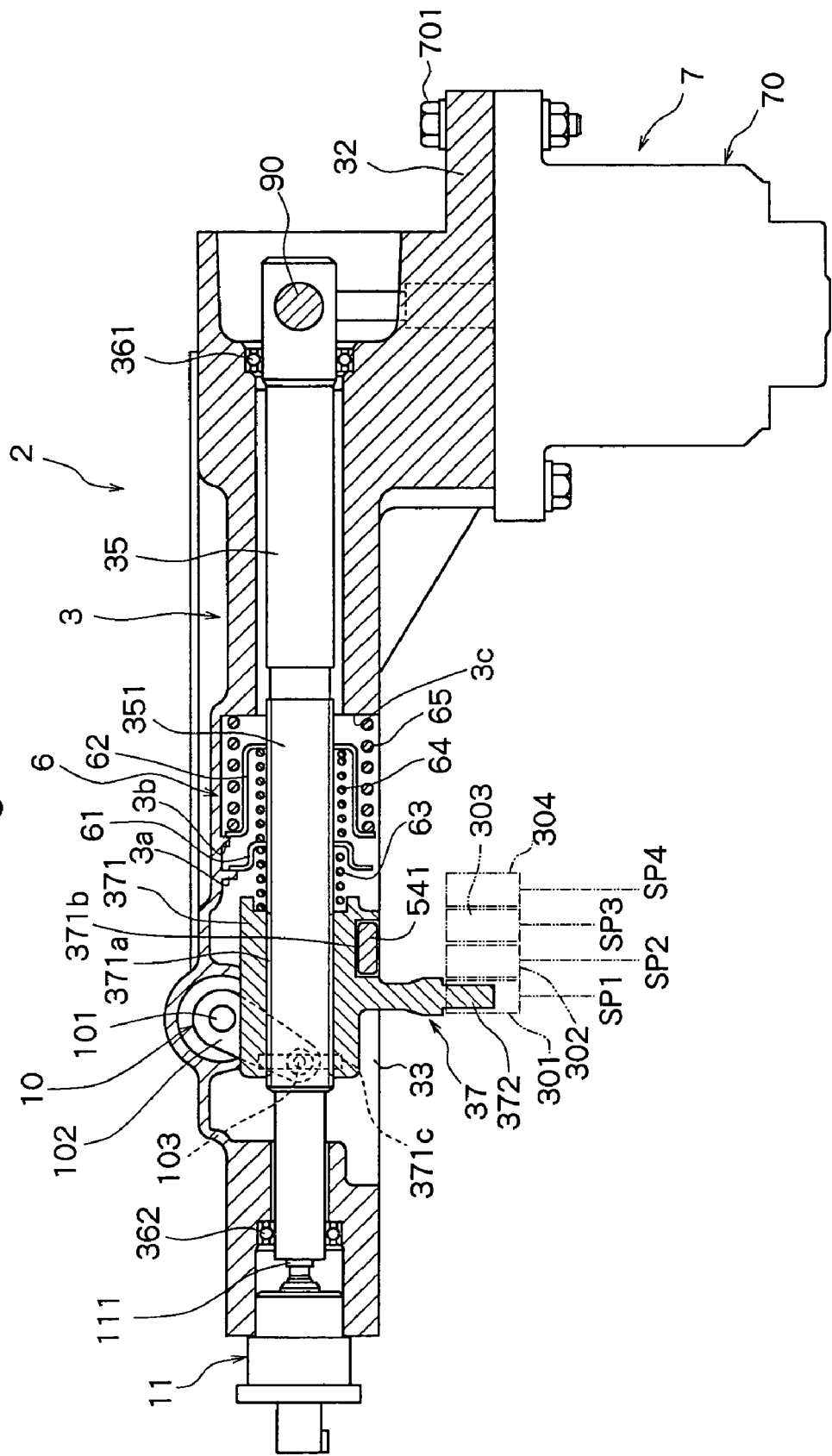
FIG. 2 is a sectional view along the line A—A in FIG. 1.
Figure 4:
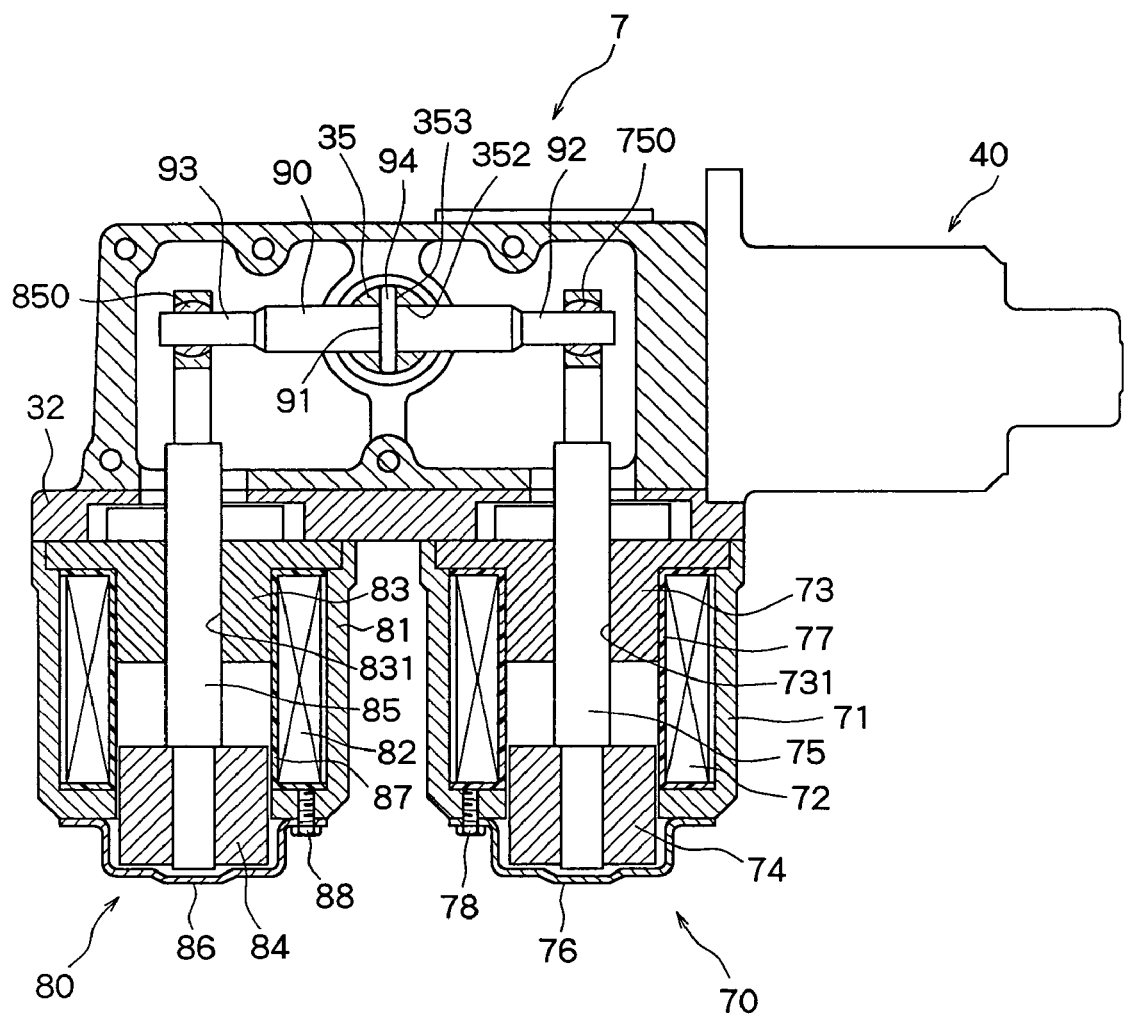
FIG. 4 is a sectional view along the line B—B in FIG. 1.

FIG. 1 is a plan view illustrating, partly in a cut-away manner, an embodiment of the gear change device equipped with a shift actuator constituted according to the present invention, FIG. 2 is a sectional view along the line A—A in FIG. 1, and FIG. 4 is a sectional view along the line B—B in FIG. 1.

The illustrated gear change device 2 is constituted by a cylindrical casing 3 for supporting a shift lever that will be described later, a select actuator 4 mounted on the casing 3 and a shift actuator 7 constituted according to the present invention. The casing 3 is equipped with a select actuator-mounting portion 31 on a side portion (upper side portion in FIG. 1) at one end thereof (right end in FIGS. 1 and 2), and a shift actuator-mounting portion 32 on a lower side portion (lower side in FIG. 2) at one end thereof (right end in FIGS. 1 and 2). Further, an opening 33 is formed in the central lower portion of the casing 3.

A control shaft 35 is turnably arranged in the casing 3 constituted as described above. That is, the control shaft 35 is supported at its one end (right end in FIGS. 1 and 2) by a bearing 361 turnably arranged at one end of the casing 3, and is supported at its other end (left end in FIGS. 1 and 2) by a bearing 362 turnably arranged at the other end of the casing 3. A shift lever 37 is mounted on the control shaft 35. The shift lever 37 comprises a mounting portion 371 having a hole that fits to the control shaft 35, and a lever portion 372 formed to protrude in the radial direction from the mounting portion 371. Referring to FIG. 2, the lever portion 372 is arranged penetrating through an opening 33 formed in the lower part of the casing 3. An internal spline 371a is formed in the inner peripheral surface of a hole, into which the control shaft 35 will fit, of the mounting portion 371 of the shift lever 37, and is spline-fitted to an external spline 351 formed on the central portion of the control shaft 35 so as to slide in the axial direction. Thus, the control shaft 35 supports the shift lever 37 to allow it to slide in the axial direction, is supported by the casing 3 so as to be allowed to turn and, further, works as a shift lever support mechanism to support the shift lever 37 arranged in the casing so as to allow it to slide in the axial direction and to allow it to turn.

In the illustrated embodiment, the control shaft 35 working as a shift lever support mechanism is arranged nearly horizontally in the casing 3.

As described above, the shift lever 37 is supported, by the control shaft 35 as a shift lever support mechanism, so as to be allowed to slide in the axial direction and to turn. An end of a lever portion 372 comes into suitable engagement with the shift blocks 301, 302, 303 and 304 that are arranged at the first select position SP1, at the second select position SP2, at the third select position SP3 and at the fourth select position SP4 and that constitute a shift mechanism of a transmission (not shown). In the illustrated embodiment, the first select position SP1 is set at a reverse gear-first gear select position, the second select position SP2 is set at the second gear-third gear select position, the third select position SP3 is set at the fourth gear-fifth gear select position, and the fourth select position SP4 is set at a sixth gear select position.

Next, the select actuator 4 for operating the shift lever 37 in the direction of select which is the axial direction, will be described with reference chiefly to FIG. 1.

The select actuator 4 of the illustrated embodiment comprises an electromagnetic solenoid 40 which works as a source of drive and a select operation mechanism 50 which is actuated by the electromagnetic solenoid 40 to operate the shift lever 37. The electromagnetic solenoid 40 comprises a cylindrical casing 41 mounted on the select actuator-mounting portion 31 by a fitting means 401 such as bolts, an electromagnetic coil 42 arranged in the casing 41, a fixed iron core 43 arranged in the electromagnetic coil 42, a moving iron core 44 arranged coaxially with the fixed iron core 43 facing one end surface (upper end surface in FIG. 1) of the fixed iron core 43, an operation rod 45 mounted on the moving iron core 44, and a cover 46 mounted on one end (upper end in FIGS. 1 and 2) of the cylindrical casing 41.

The cylindrical casing 41 has, at one end thereof (upper end in FIG. 1), an end wall 411 having a hole 412 at the central portion thereof and is open at the other end thereof (lower end in FIG. 1). The electromagnetic coil 42 is wound on an annular bobbin 47 made of a nonmagnetic material such as a synthetic resin or the like, and is arranged along the inner periphery of the casing 41. The fixed iron core 43 is formed of a magnetic material, has a flange portion 431 at the other end thereof (lower end in FIG. 1), and is mounted on the other end of the casing 41 (on the lower end in FIG. 1) via the flange portion 431. The moving iron core 44 is formed of a magnetic material, and is constituted to come into contact with, and separate away from, the fixed iron core 43 in the axial direction. The operation rod 45 is formed of a nonmagnetic material such as a stainless steel or the like and has, at one end thereof (upper end in FIG. 1), a small-diameter portion 451. The small-diameter portion 451 of the thus constituted operation rod 45 is inserted in the hole 441 formed at the central portion of the moving iron core 44 and is caulked at its one end to mount the operation rod 45 on the moving iron core 44. The other end of the operation rod 45 thus mounted, at its one end, on the moving iron core 44, is arranged at its other end penetrating through the hole 432 formed in the central portion of the fixed iron core 43, so as to slide in the axial direction and is so constituted as to enter into, and come out from, a select operation mechanism accommodation chamber 313 provided by the side of the casing 3. The other end of the operation rod 45 is provided with a ball joint 452. The cover 46 is mounted on one end of the casing 41 by using screws 48 to cover one end of the casing 41 and one end of the moving iron core 44.

Next, the select operation mechanism 50 will be described.

The select operation mechanism of the illustrated embodiment is accommodated in the select operation mechanism accommodation chamber 313, and has the first lever 51, the second lever 52, the third lever 53 and the fourth lever 54. The first lever 51 is mounted, at its one end, on a support shaft 55 that is arranged in the upward and downward directions (direction perpendicular to the surface of the paper in FIG. 1), and is slidably coupled, at its other end, to a ball joint 452 provided at the other end of the operation rod 45 of the electromagnetic solenoid 40. The second lever 52 is mounted, at its one end, on the support shaft 55 and has an engaging pin 56 at the other end. The third lever 53 is mounted, at its one end, on a support shaft 57 arranged in the upward and downward directions (direction perpendicular to the surface of the paper in FIG. 1) and has an elongated hole 531 formed in the other end portion thereof. To the elongated hole 531 is fitted an engaging pin 56 that is attached to the other end of the second lever 52. The fourth lever 54 is mounted, at its one end, on the support shaft 57 and has an operation portion 541 formed at the other end thereof, which, as shown in FIG. 2, is fitted to an engaging groove 371b formed in the mounting portion 371 of the shift lever 37.

The electromagnetic solenoid 40 and the select operation mechanism 50 constituting the select actuator 4 of the illustrated embodiment are constituted as described above. When an electric current is fed to the electromagnetic coil 42, the fixed iron core 43 is magnetized and the moving iron core 44 is attracted by the fixed iron core 43, whereby the moving iron core 44, i.e., the operation rod 45 produces a thrust toward the downward direction in FIG. 1. The magnitude of the thrust produced by the moving iron core 44, i.e., produced by the operation rod 45 is determined by the amount of electric power fed to the electromagnetic coil 42. When the moving iron core 44 or the operation rod 45 moves downward in FIG. 1 due to the electric current supplied to the electromagnetic coil 42, then, the first lever 51, second lever 52, third lever 53 and fourth lever 54 are moved from the positions indicated by solid lines and broken lines to the positions indicated by two-dot chain lines in FIG. 1. As a result, the shift lever 37 is operated by the operation portion 541 of the fourth lever 54 to move from the first select position SP1 indicated by the solid line in FIG. 2 up to the fourth select position SP4.

As shown in FIG. 2, the select actuator 4 of the illustrated embodiment has a select position-limiting mechanism 6 for limiting the position of the shift lever 37 to the first select position SP1, to the second select position SP2, to the third select position SP3 or to the fourth select position SP4 in cooperation with the magnitude of thrust produced by the moving iron core 44, i.e., by the operation rod 45 that varies in response to the amount of electric power fed to the electromagnetic coil 42 of the electromagnetic solenoid 40. The select position-limiting mechanism 6 has, at the central portion of the control shaft 35, the first moving ring 61 and the second moving ring 62 arranged so as to slide in the axial direction on the right side of the mounting portion 371 of the shift lever 37 in FIG. 2. The first moving ring 61 is limited from moving toward the left in FIG. 2 by the first stopper 3a formed on the inner peripheral surface of the casing 3. The second moving ring 62 is limited from moving toward the left in FIG. 2 by the second stopper 3b formed on the inner peripheral surface of the casing 3 and on the right side in FIG. 2 at a predetermined distance from the first stopper 3a, and is limited from moving toward the right in FIG. 2 by the third stopper 3c formed on the inner peripheral surface of the casing 3 and on the right side of the second stopper 3b in FIG. 2. Therefore, the second moving ring 62 is allowed to move between the second stopper 3b and the third stopper 3c. The first moving ring 61 has a diameter smaller than the inner diameter of the second stopper 3b and is, hence, allowed to move toward the right in FIG. 2 beyond the second stopper 3b.

The first compression coil spring 63 is arranged between the first moving ring 61 and the mounting portion 371 of the shift lever 37, and the second compression coil spring 64 is arranged between the first moving ring 61 and the second moving ring 62. Further, the third compression coil spring 65 is arranged between the second moving ring 62 and the third stopper 3c. The spring force of the second compression coil spring 64 is set to be greater than the spring force of the first compression coil spring 63, and the spring force of the third compression coil spring 65 is set to be greater than the spring force of the second compression coil spring 64. Therefore, the first moving ring 61 is brought into contact with the first stopper 3a, and the second moving ring 62 is brought into contact with the second stopper 3b.

The select actuator 4 of the illustrated embodiment is constituted as described above. The function will be described hereinbelow.

When no electric power is fed (no electric current is fed) to the electromagnetic coil 42 constituting the electromagnetic solenoid 40 of the select actuator 4, the moving iron core 44 constituting the electromagnetic solenoid 40, operation rod 45 and select operation mechanism 50 are positioned in states shown by solid lines in FIG. 1. And, the first moving ring 61 and the second moving ring 62 constituting the select position-limiting mechanism 6 are positioned in states shown in FIG. 2, where the spring forces are balanced among the first compression coil spring 63, second compression coil spring 64 and third compression coil spring 65. As a result, the shift lever 37 is brought to the first select position SP1. The first select position SP1 is set to the reverse gear-first gear select position as described above. In case the electromagnetic solenoid 40 becomes defective, therefore, the select actuator 4 brings the shift lever 37 to the reverse-first gear select position. Namely, in case the electromagnetic solenoid 40 becomes out of order, the transmission can be shifted to the first speed gear with which the vehicle starts moving or to the reverse gear, and the vehicle can be driven to a predetermined place such as a repair shop.

Figure 3:
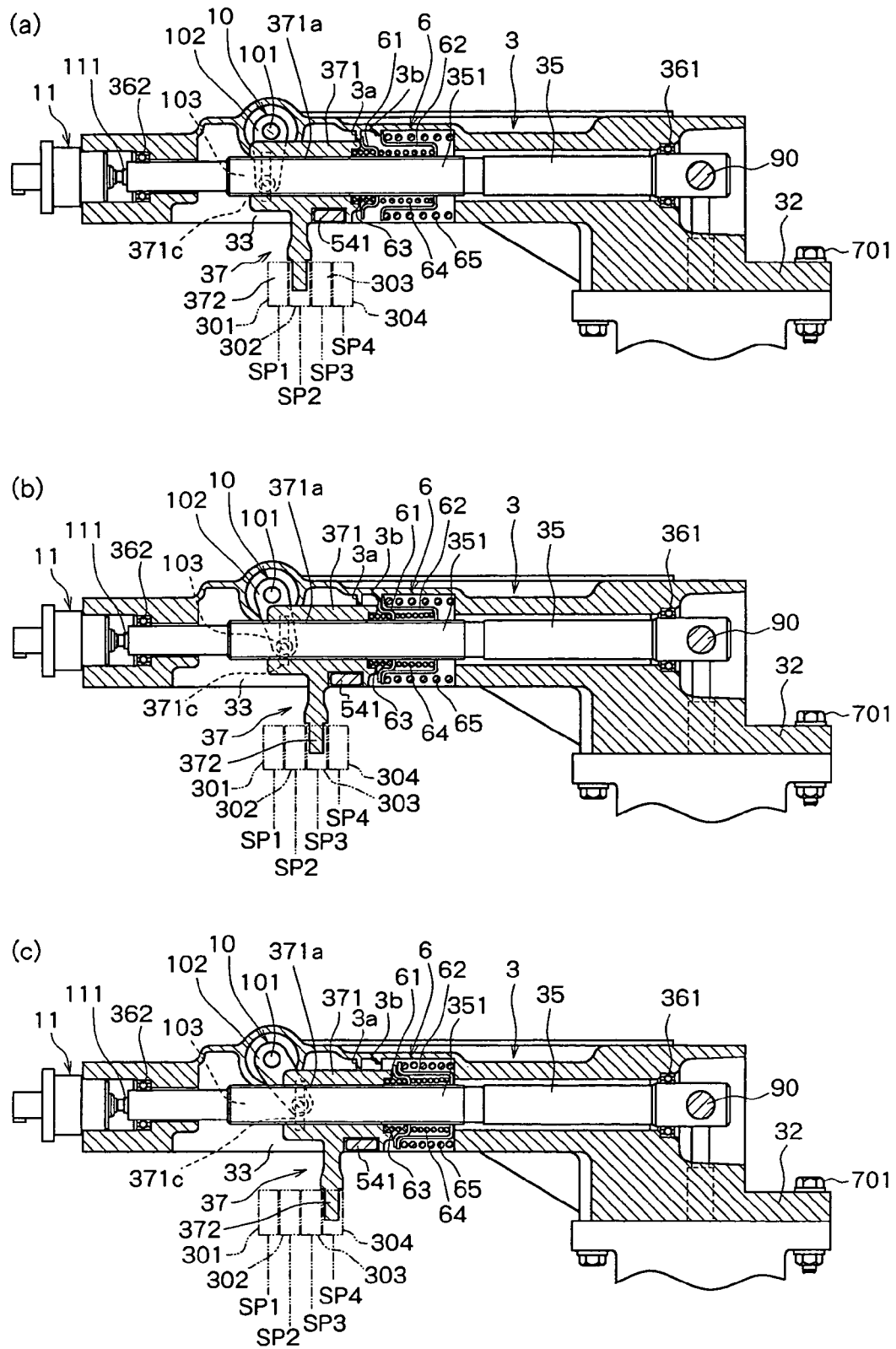
FIG. 3 is a view illustrating the operation of a select actuator that constitutes the gear change device shown in FIG. 1.

When a voltage of, for example, 2 V is applied to the electromagnetic coil 42 constituting the electromagnetic solenoid 40 of the select actuator 4 in a state shown in FIGS. 1 and 2, the moving iron core 44 is attracted by the fixed iron core 43, whereby the moving iron core 44 and the operation rod 45 produce a thrust toward the downward direction in FIG. 1. As a result, the levers constituting the select operation mechanism 50 are operated to move in the directions shown by two-dot chain lines from the states shown by solid lines in FIG. 1, whereby, as shown in FIG. 3(a), the shift lever 37 moves toward the right overcoming the spring force of the first compression coil spring 63. And, the shift lever 37 comes to a halt at a position where the right end surface of the mounting portion 371 comes into contact with the first moving ring 61, and is brought to the second select position SP2 as shown in FIG. 3(a).

Next, when a voltage of, for example, 4 V is applied to the electromagnetic coil 42 constituting the electromagnetic solenoid 40 of the select actuator 4, the moving iron core 44 and the operation rod 45 produce an increased thrust toward the downward direction. As a result, the levers constituting the select operation mechanism 50 are operated to further move in the directions shown by two-dot chain lines from the states shown by solid lines in FIG. 1, whereby, as shown in FIG. 3(b), the shift lever 37 further moves toward the right in the drawing in a state of it being in contact with the first moving ring 61 overcoming the spring forces of the first compression coil spring 63 and the second compression coil spring 64. And, the shift lever 37 comes to a halt at a position where the first moving ring 61 comes into contact with the second moving ring 62, and is brought to the third select position SP3 as shown in FIG. 3(b).

Next, when a voltage of, for example, 8 V is applied to the electromagnetic coil 42 constituting the electromagnetic solenoid 40 of the select actuator 4, the moving iron core 44 and the operation rod 45 produce a further increased thrust toward the downward direction. As a result, the levers constituting the select operation mechanism 50 are operated to move to the positions shown by two-dot chain lines in FIG. 1, whereby, as shown in FIG. 3(c), the shift lever 37 further moves toward the right in the drawing in a state where the first moving ring 51 is in contact with the second moving ring 62 overcoming the spring forces of the first compression coil spring 63, the second compression coil spring 64 and the third compression coil spring 65. And, the shift lever 37 comes to a halt at a position where the second moving ring 62 comes into contact with the third stopper 3c, and is brought to the fourth select position SP4 as shown in FIG. 3(c).

As described above, the select actuator 4 constituting the gear change device 2 actuates the shift lever 37 which is supported in the casing 3 so as to be allowed to slide in the axial direction and to turn, by using the electromagnetic solenoid 40, and has improved durability since it has no rotary mechanism. Unlike the actuator that uses an electric motor, further, the select actuator 4 does not require a speed reduction mechanism constituted by a ball-screw mechanism or a gear mechanism and hence, can be constituted in a compact size and operated at an increased speed. Besides, the illustrated select actuator 4 has a select position-limiting mechanism 6 and is constituted to bring the shift lever 37 to any one of a plurality of select positions depending upon the thrust produced by the operation rod 45 that varies in response to the amount of electric power fed to the electromagnetic coil 42. Thus, any of the plurality of select positions can be selected by using a single electromagnetic solenoid, enabling the gear change device to be constructed in a compact size and at a low cost.

Next, the shift actuator 7 according to the embodiment of the present invention will be described with reference chiefly to FIG. 4.

The illustrated shift actuator 7 has the first electromagnetic solenoid 70 and the second electromagnetic solenoid 80 as a source of drive for turning the control shaft 35 in the direction of shift, and an operation lever 90 operated by the above two electromagnetic solenoids to turn the control shaft 35. The first electromagnetic solenoid 70 and the second electromagnetic solenoid 80 are arranged in parallel with each other, below the control shaft 35, so as to operate in the upward and downward directions, and are mounted on a shift actuator-mounting portion 32 at an end of the casing 3 by a fitting means 701 such as bolts and nuts. The operation lever 90 has a pin hole 91 formed in the intermediate portion thereof, and has coupling portions 92 and 93 at both end portions thereof. The thus formed operation lever 90 is inserted into a hole 352 that is so formed in an end portion of the control shaft 35 as to intersect the axis thereof at right angles, and is mounted on the control shaft 35 by inserting a pin 94 in a pin hole 353 formed in the control shaft 35 and in the pin hole 91.

Next, the first electromagnetic solenoid 70 will be described.

The first electromagnetic solenoid 70 has the same constitution as that of the electromagnetic solenoid 40 of the select actuator 4 described above, and comprises a cylindrical casing 71, an electromagnetic coil 72 wound on an annular bobbin 77 which is arranged in the casing 71 and is made of a nonmagnetic material such as a synthetic resin or the like, a fixed iron core 73 which is arranged in the electromagnetic coil 72 and is formed of a magnetic material, a moving iron core 74 which is formed of a magnetic material and is arranged coaxially with the fixed iron core 73 being opposed to one end surface of the fixed iron core 73, an operation rod 75 which is formed of a nonmagnetic material such as a stainless steel or the like and is arranged to slide in the axial direction with its one end being mounted on the moving iron core 74 and its other end penetrating through a hole 731 formed in the central portion of the fixed iron core 73, and a cover 76 mounted on one end of the cylindrical casing 71 by using screws 78. A ball joint 750 is provided at the other end portion of the operation rod 75 that constitutes the first electromagnetic solenoid 70. A coupling portion 92 formed at one end of the operation lever 90 is slidably coupled to the ball joint 750. When an electric current is fed to the electromagnetic coil 72 of the thus constituted first electromagnetic solenoid 70, the moving iron core 74 is attracted by the fixed iron core 73. As a result, the operation rod 75 mounted on the moving iron core 74 moves upward in FIG. 3, whereby the operation lever 90 which is coupled at its one end, to the operation rod 75 at the coupling portion 92 turns counterclockwise in FIG. 3 on the control shaft 35. Thereby, the control shaft 35 mounting the operation lever 90 turns, and the shift lever 37 spline-fitted to the control shaft 35 is shifted in the first direction.

Next, the second electromagnetic solenoid 80 will be described.

Like the first electromagnetic solenoid 70, the second electromagnetic solenoid 80, too, comprises a cylindrical casing 81, an electromagnetic coil 82 wound on an annular bobbin 87 which is arranged in the casing 81 and is made of a nonmagnetic material such as a synthetic resin or the like, a fixed iron core 83 which is arranged in the electromagnetic coil 82 and is formed of a magnetic material, a moving iron core 84 which is formed of a magnetic material and is arranged coaxially with the fixed iron core 83 being opposed to one end surface of the fixed iron core 83, an operation rod 85 which is formed of a nonmagnetic material such as a stainless steel or the like and is arranged so as to slide in the axial direction with its one end being mounted on the moving iron core 84 and its other end penetrating through a hole 831 formed in the central portion of the fixed iron core 83, and a cover 86 mounted on one end of the cylindrical casing 81 by using screws 88. A ball joint 850 is provided at the other end portion of the operation rod 85 that constitutes the second electromagnetic solenoid 80. A coupling portion 93 formed at the other end of the operation lever 90 is slidably coupled to the ball joint 850. When an electric current is fed to the electromagnetic coil 82 of the thus constituted second electromagnetic solenoid 80, the moving iron core 84 is attracted by the fixed iron core 83. As a result, the operation rod 85 mounted on the moving iron core 84 moves upward in FIG. 3, whereby the operation lever 90 coupled, at its one end, to the operation rod 85 at the coupling portion 93 turns clockwise in FIG. 3 on the control shaft 35. Thereby, the control shaft 35 mounting the operation lever 90 turns, and the shift lever 37 spline-fitted to the control shaft 35 is shifted in the second direction.

As described above, the shift actuator 7 of the illustrated embodiment comprises the first electromagnetic solenoid 70 and the second electromagnetic solenoid 80 arranged in parallel with each other below the control shaft 35 mounting the shift lever 37 so as to operate in the upward and downward directions, and an operation lever 90 mounted at its intermediate portion on the control shaft 35. Since the operation rod 75 of the first electromagnetic solenoid 70 is coupled to one end of the operation lever 90 and the operation rod 85 of the second electromagnetic solenoid 80 is coupled to the other end of the operation lever 90, the effects of gravity acting on the moving iron cores 74 and 84 that mount the operation rods 75 and 85 respectively are offset each other. The first electromagnetic solenoid 70 and the second electromagnetic solenoid 80 are arranged to operate in the upward and downward directions as described above and hence, are not affected by the acceleration or deceleration of the vehicle. At the same time, the moving iron cores 74 and 84 can have very small slide resistance. Therefore, the shift actuator 7 of the illustrated embodiment produces a constant shifting force at all times correspondingly to the electric power fed to the electromagnetic coil 72 of the first electromagnetic solenoid 70 and to the electromagnetic coil 82 of the second electromagnetic solenoid 80.

The gear change device 2 of the illustrated embodiment has a selected position sensor 10 for detecting a position of the shift lever 37 in the axial direction, i.e., in the direction of selection. The selected position sensor 10 comprises a potentiometer, and its rotary shaft 101 is mounted to one end portion of the lever 102. An engaging pin 103 attached to the other end portion of the lever 102 is engaged with the engaging groove 371c formed in the side surface of the mounting portion 371 of the shift lever 37. Therefore, when the shift lever 37 moves toward the right or left in FIG. 2, the lever 101 swings on the rotary shaft 101, whereby the rotary shaft 101 turns to detect the operating position of the shift lever 37 in the axial direction, i.e., the position of the shift lever 37 in the direction of selection.

Further, the gear change device 2 of the illustrated embodiment includes a shift stroke position sensor 11 for detecting a rotational position of the shift lever 37, i.e., for detecting the shift stroke position of the shift lever 37. The shift stroke position sensor 11 is mounted on the other end (left end in FIG. 2) of the casing 31. The shift stroke position sensor 11 is a potentiometer, and its rotary shaft 111 is coupled to the other end of the control shaft 35 that is spline-fitted to the shift lever 37. When the shift lever 37 turns, therefore, the control shaft 35 turns to detect the rotational position of the shift lever 37, i.e., the shift stroke position thereof.

As described above, in the gear change device 2 of the illustrated embodiment, the electromagnetic solenoid 40 that constitutes the select actuator 4, and the first electromagnetic solenoid 70 and the second electromagnetic solenoid 80 that constitute the shift actuator 7 are arranged on one end side of the casing that constitutes the select actuator 3, while the shift stroke position sensor 11 for detecting the turning amount of the shift lever 37, i.e., of the control shaft 35 is arranged on the other end side of the casing. Therefore, the shift stroke position sensor 11 is not affected by the magnetic field generated by the electromagnetic solenoids. In the illustrated embodiment, further, the select position sensor 10, too, is arranged at the central portion of the casing and hence, is not affected by the magnetic field generated by the electromagnetic solenoids arranged on one end side of the casing.

Figure 5:
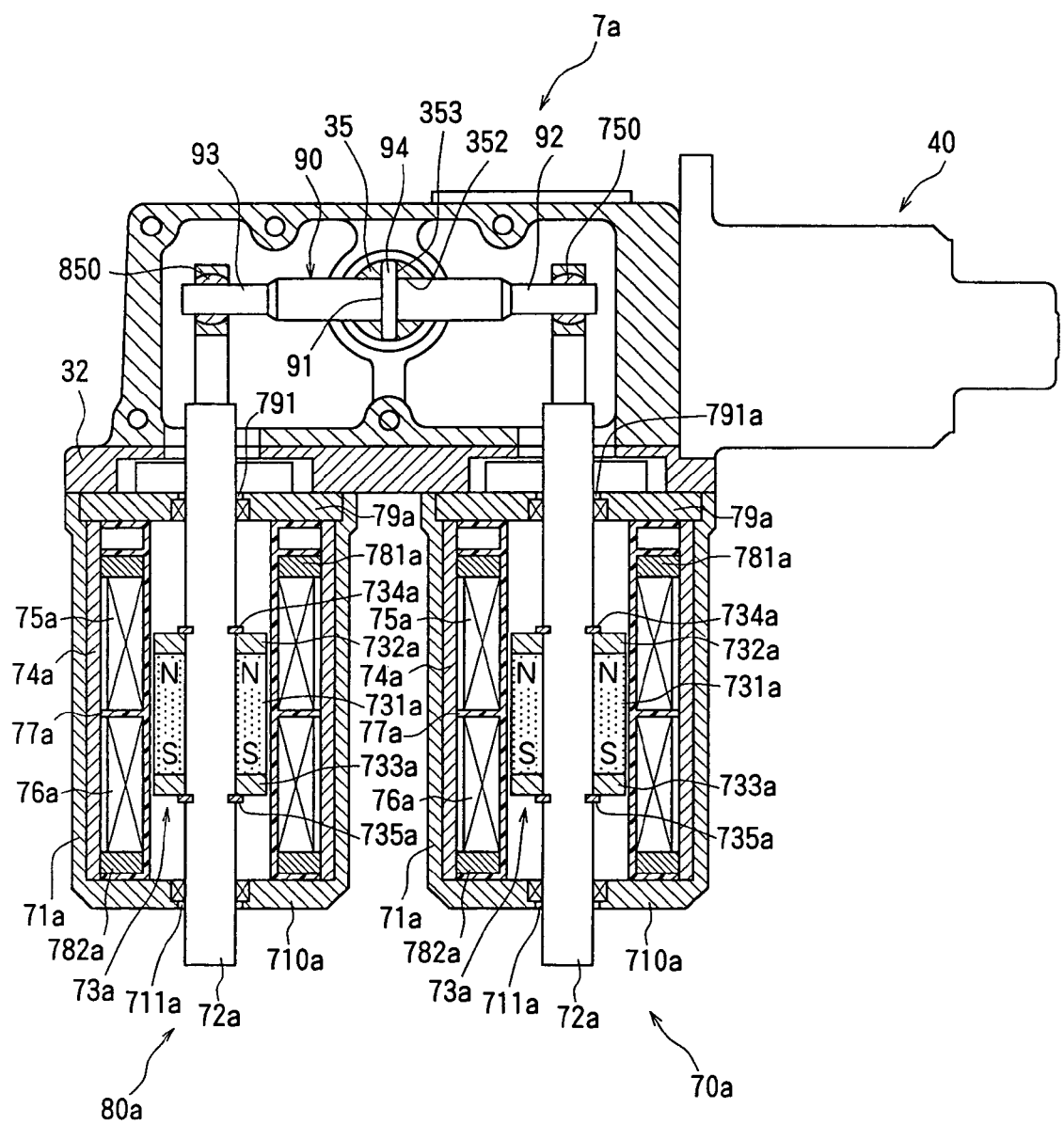
FIG. 5 is a sectional view illustrating another embodiment of a shift actuator constituted according to the present invention.
Figure 6:
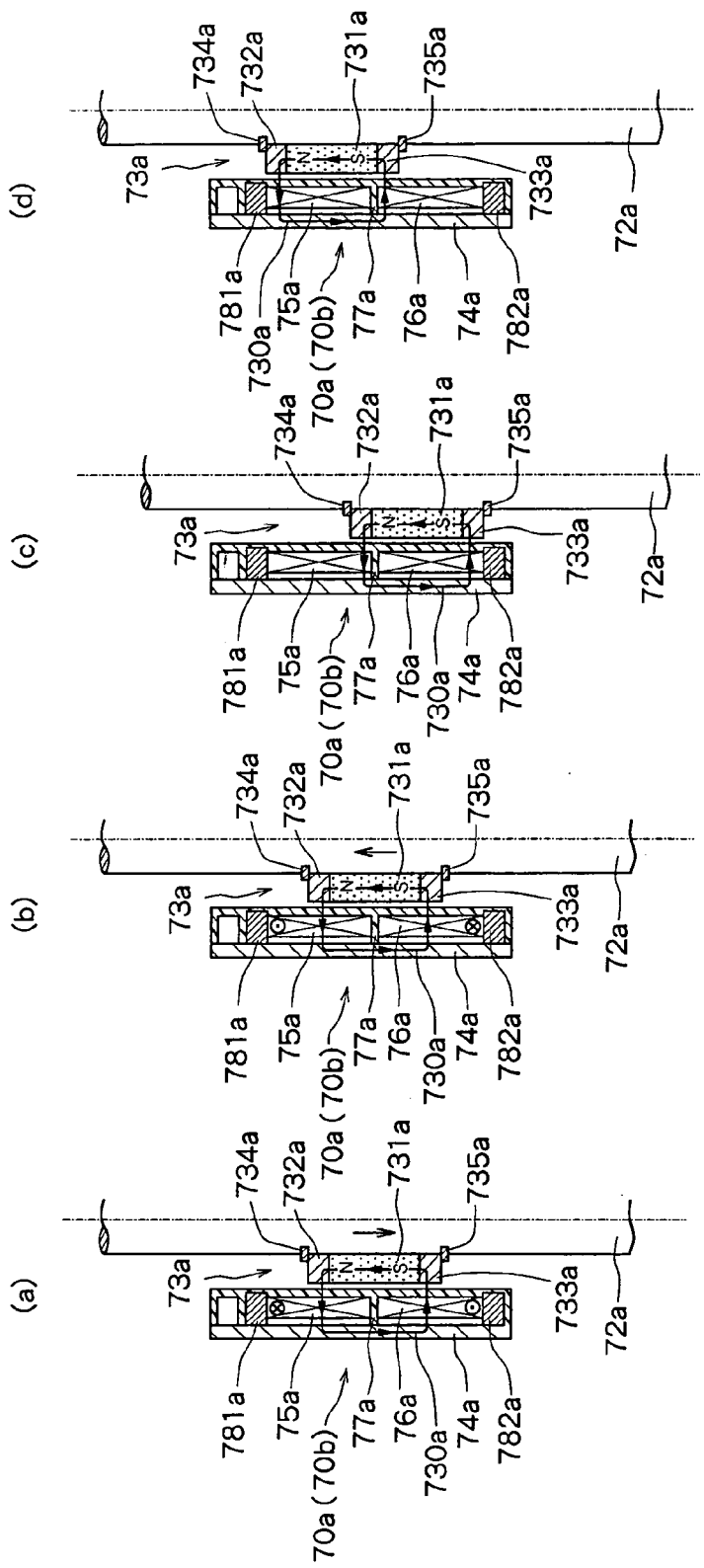
FIG. 6 is a view illustrating the operation of the shift actuator shown in FIG. 5.
Figure 7:
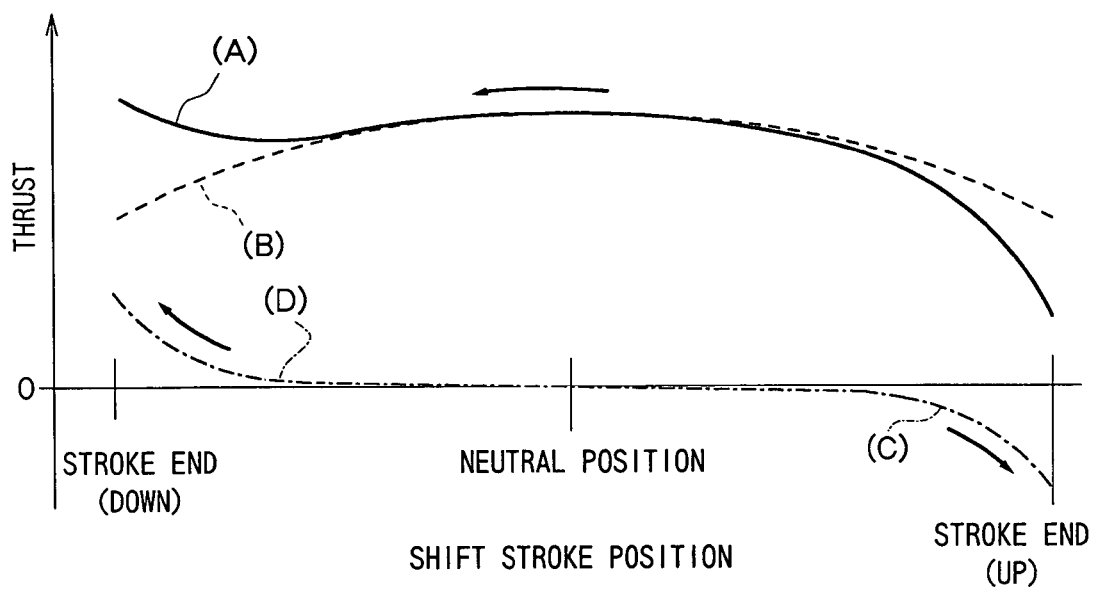
FIG. 7 is a diagram illustrating the driving forces of the shift actuator shown in FIG. 5.
Figure 7:
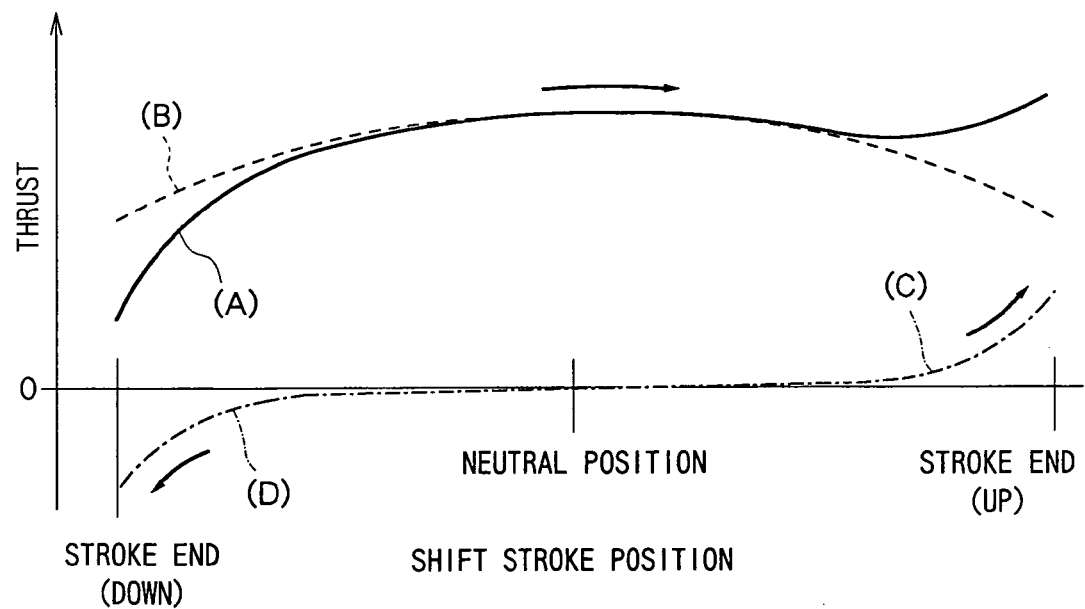

Next, the shift actuator 7a according to another embodiment of the present invention will be described with reference to FIGS. 5 to 7. In the embodiment shown in FIGS. 5 to 7, the same members as those of the embodiment of FIGS. 1 to 4 are denoted by the same reference numerals, and their description is not repeated.

The shift actuator 7a shown comprises the first actuator 70a and the second actuator 80a as a source of drive for turning the control shaft 35 in the direction of shift, and the operation lever 90 operated by the above two actuators to turn the control shaft 35. The first actuator 70a and the second actuator 80a are arranged in parallel with each other below the control shaft 35 to operate in the upward and downward directions, and are mounted on a shift actuator-mounting portion 32 at an end of the casing 3 by a fitting means such as bolts and nuts.

Next, the first actuator 70a will be described.

The first actuator 70a comprises a casing 71a, an operation rod 72a arranged in the central portion of the casing 71a so as to slide in the upward and downward directions, a magnetic moving member 73a arranged on the outer peripheral surface of the operation rod 72a, a cylindrical fixed yoke 74a arranged on the inside of the casing 71a to surround the magnetic moving member 73a, and a pair of coils 75a and 76a arranged side by side in the axial direction on the inside of the fixed yoke 74a.

In the illustrated embodiment, the casing 71a is formed of a nonmagnetic material such as a stainless steel or an aluminum alloy in a cylindrical shape. The operation rod 72a is made of a nonmagnetic material such as a stainless steel or the like and has a ball joint 750 at an upper end thereof. The coupling portion 92 formed at an end portion of the operation lever 90 is slidably coupled to the ball joint 750.

The magnetic moving member 73a is constituted by an annular permanent magnet 731a mounted on the outer peripheral surface of the operation rod 72a and having magnetic poles at both end surfaces in the axial direction and by a pair of moving yokes 732a and 733a arranged on the outer side of the permanent magnet 731a in the axial direction. The permanent magnet 731a of the illustrated embodiment is magnetized into the N-pole at the upper end surface in FIG. 5 and is magnetized into the S-pole at the lower end surface in FIG. 5. The above pair of moving yokes 732a and 733a is formed of a magnetic material in an annular shape. The thus constituted magnetic moving member 73a is positioned at its both sides by snap rings 734a and 735a mounted to the operation rod 72a, and is limited from moving in the axial direction.

The fixed yoke 74a is formed of a magnetic material in a cylindrical shape and is mounted on the inner peripheral surface of the casing 71a. A pair of coils 75a and 76a is arranged on the inside of the fixed yoke 74a. The pair of coils 75a and 76a is wound on a bobbin 77a that is made of a nonmagnetic material such as a synthetic resin and is mounted along the inner periphery of the fixed yoke 74a. The pair of coils 75a and 76a is connected to a power source circuit that is not shown. In the illustrated embodiment, magnetic members 781a and 782a are arranged in the bobbin 77a on both sides of the pair of coils 75a and 76a. The magnetic members 781a and 782a are formed of a magnetic material such as iron or the like, in an annular shape.

An end wall 79a is mounted on an upper end portion of the casing 71a. The upper end wall 79a is formed of a nonmagnetic material such as a stainless steel, aluminum alloy or a suitable synthetic resin. Holes 791a and 711a are respectively formed in the end wall 79a and in the lower end wall 710a of the casing 71a at the central portions thereof enabling the operation rod 72a to pass through. The operation rod 72a is arranged passing through the holes 791a and 711a, and is supported by the inner peripheral surfaces of the holes 791a and 711a so as to slide in the axial direction.

Next, the second actuator 80a will be described.

The second actuator 80a has substantially the same constitution as the above first actuator 70a. Therefore, the same members are denoted by the same reference numerals and their description is not repeated. A ball joint 850 is provided at the upper end of the operation rod 72a that constitutes the second actuator 80a, and the coupling portion 93 provided at the other end of the operation lever 90 is slidably coupled to the ball joint 850.

The actuator 7a of the illustrated embodiment is constituted as described above. The operation will now be described with reference to FIG. 6.

The first actuator 70a and the second actuator 80a constituting the shift actuator 7a operate, respectively, based on the principle of a linear motor constituted by the magnetic moving member 73a arranged on the operation rod 72a, fixed yoke 74a and the pair of coils 75a and 76a. The operation will now be described with reference to FIG. 6.

The first actuator 70a and the second actuator 80a form a magnetic circuit 730a, as shown in FIG. 6(a) to 6(d), passing through the N-pole of the permanent magnet 731a, one moving yoke 732a, one coil 75a, fixed yoke 74a, other coil 76a, other moving yoke 733a and S-pole of the permanent magnet 731a.

When the electric currents are supplied to the pair of coils 75a and 76a in the opposite directions shown in FIG. 6(a) in a state of the operation rod 72a locating at the neutral position shown in FIG. 6(a), the magnetic moving member 73a or the operation rod 72a produces a downward thrust as indicated by an arrow in FIG. 6(a) according to the Fleming's left-hand rule. Meanwhile, when the electric currents are supplied to the pair of coils 75a and 76a in the opposite directions shown in FIG. 6(b) (opposite to that of FIG. 6(a)) in a state of the operation rod 72a locating at the neutral position, the magnetic moving member 73a or the operation rod 72a produces an upward thrust as indicated by an arrow in FIG. 6(b) according to the Fleming's left-hand rule.

Therefore, when the electric currents are supplied, in the directions shown in FIG. 6(a), to the pair of coils 75a, 76a of the first actuator 70a and the electric currents are supplied, in the directions shown in FIG. 6(b), to the pair of coils 75a, 76a of the second actuator 80a, the operation rod 72a of the first actuator 70a moves downward and the operation rod 72a of the second actuator 80a moves upward. As a result, the control shaft 35 turns in the clockwise direction in FIG. 5 via the operation lever 90 which is coupled to the operation rod 72a of the first actuator 70a and to the operation rod 72a of the second actuator 80a via ball joints 750 and 850. Therefore, the shift lever 37 spline-fitted to the control shaft 35 is shifted in the first direction. As the magnetic moving member 73a or the operation rod 72a of the first actuator 70a reaches the position shown in FIG. 6(c) and the operation rod 72a of the second actuator 80a reaches the position shown in FIG. 6(d), it is, then, judged that the controller (not shown) has moved to the one shift stroke end, i.e., to the gear-engaging position in response to a signal from the shift stroke position sensor 11, and the electric current is interrupted from being supplied to the pair of coils 75a, 76a of the first actuator 70a and to the pair of coils 75a, 76a of the second actuator 80a.

On the other hand, when the electric currents are supplied, in the directions shown in FIG. 6(b), to the pair of coils 75a, 76a of the first actuator 70a and the electric currents are supplied, in the directions shown in FIG. 6(a), to the pair of coils 75a, 76a of the second actuator. 80a, the operation rod 72a of the first actuator 70a moves upward and the operation rod 72a of the second actuator 80a moves downward. As a result, the control shaft 35 turns in the counterclockwise direction in FIG. 5 via the operation lever 90 which is coupled to the operation rod 72a of the first actuator 70a and to the operation rod 72a of the second actuator 80a via ball joints 750 and 850. Therefore, the shift lever 37 spline-fitted to the control shaft 35 is shifted in the second direction. As the magnetic moving member 73a or the operation rod 72a of the first actuator 70a reaches the position shown in FIG. 6(d) and the operation rod 72a of the second actuator 80a reaches the position shown in FIG. 6(c), it is, then, judged that the controller (not shown) has moved to the one shift stroke end, i.e., to the gear-engaging position in response to a signal from the shift stroke position sensor 11, and the electric current is interrupted from being supplied to the pair of coils 75a, 76a of the first actuator 70a and to the pair of coils 75a, 76a of the second actuator 80a.

Here, the driving forces of the first actuator 70a and of the second actuator 80a constituting the shift actuator 7a will be described with reference to FIG. 7.

FIG. 7(a) illustrates the driving force of the first actuator 70a at the time when the magnetic moving member 73a or the operation rod 72a of the first actuator 70a is to be moved downward, and FIG. 7(b) illustrates the driving force of the second actuator 80a. Conversely, FIG. 7(b) illustrates the driving force of the first actuator 70a at the time when the magnetic moving member 73a or the operation rod 72a of the first actuator 70a is to be moved upward, and FIG. 7(a) illustrates the driving force of the second actuator 80a. In FIGS. 7(a) and 7(b), broken lines (B) represent thrust characteristics based on the principle of a linear motor constituted by the magnetic moving member 73a, fixed yoke 74a and the pair of coils 75a, 76a; dot-dash chain lines (C) represent the attracting forces between the permanent magnet 731a and the magnetic member 781a; dot-dash chain lines (D) represent the attracting forces between the permanent magnet 731a and the magnetic member 782a; and solid lines (A) represent the driving forces of the first actuator 70a and of the second actuator 80a at the time when an electric current is supplied to the pair of coils 75a, 76a. That is, the driving forces of the first actuator 70a and of the second actuator 80a of when the electric current is supplied to the pair of coils 75a, 76a, represented by the solid lines (A), are the synthesis of the thrusts represented by the broken lines (B) based on the principle of the linear motor constituted by the magnetic moving member 73a, the fixed yoke 74a and the pair of coils 75a, 76a, and the attracting forces between the permanent magnet 731a and the magnetic members 781, 782a, represented by dot-dash chain lines (C) and (D).

The first actuator 70a and the second actuator 80a in the illustrated embodiment have a pair of magnetic members 781a and 782a arranged on both sides of the pair of coils 75a and 76a. Even when no electric current is supplied to the pair of coils 75a, 76a, therefore, the attractive force is produced between the permanent magnet 731a and the magnetic materials 781a, 782a as represented by dot-dash chain lines (C) and (D). The attractive force increases as the permanent magnet 731a, the moving yokes 732a, 733a and the magnetic member 781*a* or 782*a* approach each other, and becomes the greatest at the shift stroke end. When, for example, the first actuator 70*a* moves the magnetic moving member 73*a* or the operation rod 72*a* downward from the state shown in FIG. 6(*d*), the attractive force between the permanent magnet 731*a* and the magnetic member 781*a* works to prevent the motion toward the neutral position from the gear-engaged position, i.e., to prevent the gear of the transmission from being disengaged or, in other words, works as a self-holding function. Here, the second actuator 80*a* works to move the magnetic moving member 73*a* or the operation rod 72*a* upward from the state of FIG. 6(*c*), and the attracting force between the permanent magnet 731*a* and the magnetic member 782*a* works to prevent the motion toward the neutral position from the gear-engaged position, i.e., to prevent the gear of the transmission from being disengaged. Thus, at the gear-engaged position, the permanent magnet 731*a* of the magnetic moving member 73*a* and the magnetic members 781*a*, 782*a* of the first actuator 70*a* and the second actuator 80*a*, work to prevent the gear of the transmission from being disengaged, i.e., work as a self-holding function. In order to prevent the gear from being disengaged, in general, the shifting mechanism of the transmission is provided with a detent mechanism for holding the state of being actuated to the shift stroke end, i.e., being actuated to the gear-engaging position. In the first actuator 70*a* and the second actuator 80*a*, the attractive force between the permanent magnet 731*a* of the magnetic moving member 73*a* and the magnetic members 781*a*, 782*a* near the shift stroke end, serves as a detent function.

As described above, the shift actuator 7*a* of the above illustrated embodiment comprises the first actuator 70*a* and the second actuator 80*a* arranged in parallel with each other below the control shaft 35 mounting the shift lever 37 in such a manner as to move in the upward and downward directions, and the operation lever 90 mounted at its intermediate portion on the control shaft 35. Since the operation rod 72*a* of the first actuator 70*a* is coupled to an end portion of the operation lever 90 and the operation rod 72*a* of the second actuator 80*a* is coupled to the other end portion of the operation lever 90, the effects of gravity acting on the operation rod 72*a* and on the magnetic moving member 73*a* of the first actuator 70*a* and of gravity acting on the operation rod 72*a* and on the magnetic moving member 73*a* of the second actuator 80*a* can be offset each other. Further, the first actuator 70*a* and the second actuator 80*a* are arranged so as to operate in the upward and downward directions as described above and hence, are not affected by the acceleration or deceleration of the vehicle and at the same time, the operation rods 72*a*, 72*a*, too, can have very small slide resistance. Therefore, the shift actuator 7*a* of the illustrated embodiment produces a constant operation force at all times correspondingly the electric power supplied to the pair of coils 75*a*, 76*a* of the first actuator 70*a*, and to the pair of coils 75*a*, 76*a* of the second actuator 80*a*.

What is claim is:

1. A shift actuator for a transmission, said shift actuator comprising:
   a shift lever support mechanism mounting a shift lever of the transmission;
   an operation lever having an intermediate portion coupled to said shift lever support mechanism;
   a first actuator having an operation rod pivotally coupled to one end of said operation lever and operable in an upward direction, to push said one end of said operation lever upward, causing pivoting of said shift lever support member in a first angular direction, and operable in a downward direction, to pull said one end of said operation lever downward, causing pivoting of said shift lever support member in a second angular direction, opposite the first angular direction;
   a second actuator having an operation rod pivotally coupled to the other end of said operation lever and operable in an upward direction, to push said other end of said operation lever upward, causing pivoting of said shift lever in the second angular direction, and operable in a downward direction, to pull said other end of said operation lever downward, causing pivoting of said operation lever support member in the first angular direction, wherein:
   each of said first actuator and said second actuator comprises a magnetic moving member on an outer peripheral surface of said operation rod, a cylindrical fixed yoke surrounding said magnetic moving member, and a pair of coils arranged side by side in the axial direction of said operation rod inside said fixed yoke.

2. A shift actuator according to claim 1, wherein said shift lever support mechanism is arranged nearly in a horizontal state, and said first actuator and said second actuator are below said shift lever support mechanism.

3. A shift actuator for a transmission according to claim 1, wherein magnetic members are arranged on both sides of said pair of coils.

4. A shift actuator for a transmission according to claim 3, wherein said magnetic members are arranged in bobbins on which said pair of coils is wound.

5. A shift actuator according to claim 1, wherein said first and second actuators are arranged and configured to operate simultaneously.

6. A shift actuator according to claim 5, wherein said first and second actuators operate simultaneously in opposite directions.

7. A shift actuator according to claim 1, wherein said first and second actuators are arranged and operable to offset effects of gravity such that the first actuator is operable to offset effects of gravity on the second actuator, and the second actuator is operable to offset effects of gravity on the first actuator.

* * * * *